E. FARNUM & G. W. SCOTT
HUSKING MACHINE.
No. 61,823. Patented Feb. 5, 1867.
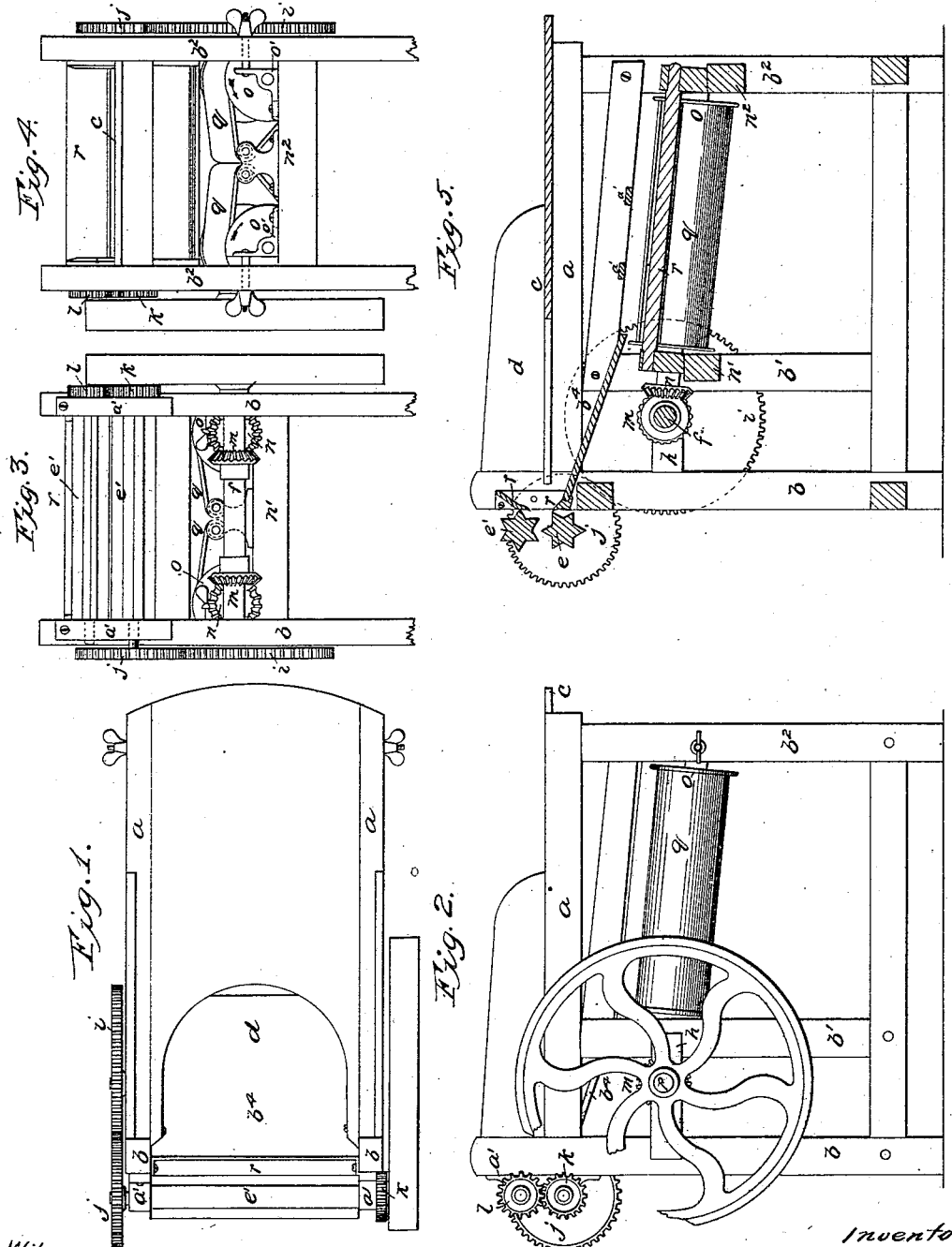

United States Patent Office.

EDWARD FARNUM AND GEORGE W SCOTT, OF BLACKSTONE, MASSACHUSETTS.

Letters Patent No. 61,823, dated February 5, 1867.

IMPROVEMENT IN HUSKING MACHINE.

*The Schedule referred to in these Letters Patent and making part of the same.*

TO ALL TO WHOM THESE PRESENTS SHALL COME:

Be it known that we, EDWARD FARNUM and GEORGE W. SCOTT, of Blackstone, in the county of Worcester, and State of Massachusetts, have invented a new and useful Machine for Husking Corn, and do hereby declare the following to be a full, clear, and exact description thereof, reference being had to the accompanying drawings, making part of this specification, and in which—

Figure 1 is a top view.

Figure 2, a side elevation.

Figures 3 and 4 are end elevations; and

Figure 5, a vertical and longitudinal section of my invention.

The invention consists in the combination and arrangement of a pair of fluted stripping-rollers, and retaining bars or "hold-backs," with two endless husking aprons, and supported upon revolving drums or shafts, this combination of parts operating together, and in connection with a chute or hopper, essentially as hereinafter described.

As exhibited in the drawings, the frame of the machine is shown as composed of a rectangular frame, $a$, and a series of posts or standards, $b$ $b^1$ $b^2$, a flooring, $c$, extending partially across the upper surface of the frame $a$, serving as a bottom to a hopper or chute, $d$, for the reception of the stalks of corn as they are fed along towards the stripping-rollers. These stripping-rollers are shown at $e$ $e^1$ as having the periphery fluted, and so arranged with respect to each other that the projections of one roller shall be opposite to the depression of its twin or opposite roller, as shown in fig. 5 of the drawings, the journals of these rollers being supported in boxes $a^1$ $a^1$, fixed to the upper parts of the posts $b$ $b$, as represented. The driving-shaft of the machine is shown at $f$ as supported in suitable boxes upheld by bars or braces $h$ $h$, extending from the leg $b$ to the leg $b^1$. The rear extremity of the driving-shaft $f$ carries a gear, $i$, which meshes with a smaller gear, $j$, fixed to the rear extremity of the journal of the lower stripping-roller $e$, and puts the said roller $e$ in rotation. The opposite or front end of this roller $e$ carries a pinion, $k$, which engages with another pinion, $l$, fixed on the journal of the upper stripping-roller $e^1$, by this means imparting motion to the said roller $e^1$. Furthermore, the driving-shaft $f$ carries two bevelled gears $m$ $m$, which engage respectively with two other bevelled gears $n$ $n$ fixed upon the journals of two inclined revolving drums $o$ $o$, suitably supported in boxes $o^1$ $o^1$, upheld by cross-bars or braces $n^1$ $n^2$, extending from the leg $b^1$ to the leg $b^2$, there being, further, two shafts $p$ $p$ upheld by the cross-bars, as represented in the drawings, and so as to stand upon the same inclination as the drums. Two endless husking aprons $q$ $q$ are carried by the drums $o$ $o$, and shafts $p$ $p$, which are so actuated by their operating gears as to cause the aprons to travel inwardly towards each other, and downward, or as shown in fig. 4 of the drawings. Two inclined bars $r$ $r$ are secured to the upper ends of the posts $b$ $b$, and extend across from one to the other of them at the inner end of the chute $d$, and in advance of the fluted rollers $e$ $e^1$, the object of these bars, which I term the "hold-backs," being to retain or keep back the ears of corn from being drawn between the rollers with the stalks. In the operation of the above described machine, the stalks of corn with the ears upon them, as they are cut in the field, are to be placed upon the flooring $c$, of the hopper $d$, and pushed forward between the rollers $e$ $e^1$. The revolution of the rollers will draw the stalk forward and break the connection of the ear, the shank or stub of the ear adhering to the stalk, the ear itself, as before mentioned, being kept back by the bars $r$ $r$. In this operation, a great portion of the husks will be stripped from the ear and carried with the stalk. The ear, with the husks that may adhere to it, will slide down an inclined bridge, $b^4$, leading from an opening in the floor of the hopper, and will pass from thence upon the upper surface of the revolving aprons $q$ $q$, which will seize and carry between them and strip from the ear its remaining husks, the close proximity of the aprons to each other preventing the ear from being drawn between them. The ears of corn, after having been thus husked, will pass in succession down the inclined surface of the aprons, and dropped therefrom at one end of the machine into a proper receptacle. It will thus be seen that the action of the endless aprons upon the ear, as it descends the inclined plane of their upper surface, will be such as to keep the ear in revolution until all its husks have been caught and torn from it. Theoretically speaking, it might be supposed that as the endless aprons are on the same level and travelling at the same rate of speed, the ear of corn would not be caused to revolve by them.

In practice, owing to the rough and irregular surface of the ear and its husks, the aprons will act alternately upon it, it being thrown from one to the other, and thus kept in revolution. I have contemplated, however, applying two or more rollers above the revolving drums, which will catch and strip from the ear such husks as may not have been caught by the endless aprons, should there be any such. It might sometimes happen that one end of the ear would be caught by the endless aprons and thrown up into a vertical position, and stop their revolutions. To remedy this, I apply to opposite sides of the frame $a$, and so as to extend immediately over the aprons, a range of bars, $a^1 a^1$, as shown in fig. 5 of the drawings. Should the ear be caught at one end, its opposite end, on being thrown upward, would strike against the bars $a^1 a^1$, which would prevent the injurious consequences above referred to. In order to reduce the thickness and consequent cost of construction of the elastic aprons, and at the same time secure sufficient elasticity, the shafts $p\, p$, before referred to, may be covered with one or more layers of felt, or its equivalent material. It may be found in practice that more beneficial results may be secured by the employment of a non-elastic substance for these aprons. Present experience, however, would show that an elastic apron, with either a smooth or roughened surface, will be preferable. The boxes or bearings of the drums $o\, o$ should be applied to the frame of the machine in an adjustable manner, to allow of the aprons being tightened as occasion may require.

I am aware of United States Patent, No. 17,269, and dated May 12, 1857, in which two endless aprons running upward and forming a hopper are employed to loosen the husks about the ear, which with the husks upon it falls upon a horizontal endless apron, which serves the purpose merely of conveying the ears to the husking rollers. These rollers will catch and pull from the ear only such portions of the husks as may come in contact with them, as the ear passes directly over them, without, as in my invention, making a number of revolutions so as to present all sides of it to the action of the husking aprons. I lay no claim to the subject of such patent.

I claim as my invention the improved stripping and husking machine, as composed of the fluted rollers $e\, e^1$, the hold-back bars $r\, r$, the endless aprons $q\, q$, the bridge $b^4$, and the horizontal bars $a^1 a^1$, combined and operating in connection with the hopper or chute $d$, substantially in manner as specified.

I also claim the peculiar construction and arrangement or combined action of the two stripping-rollers $e\, e^1$, and bars $r\, r$, essentially in manner and for the purpose as before described.

I also claim, in combination with this arrangement of the rollers $e\, e^1$, and with the chute $d$, the inclined bars or "hold-backs" $r\, r$, substantially as before explained.

I also claim the employment of the two endless aprons $q\, q$ as a means of husking, or completing the husking of the ears of corn, in manner and for the purpose as set forth.

I also claim, in combination with the endless aprons $q\, q$, the transverse bars $a^1 a^1$, as and for the purpose before set forth and explained.

EDW. FARNUM,
GEORGE W. SCOTT.

Witnesses:
 FREDERICK CURTIS,
 FRANCIS CURTIS.